United States Patent
Toh et al.

(10) Patent No.: US 9,808,986 B2
(45) Date of Patent: Nov. 7, 2017

(54) PRINTING HEAD ASSEMBLY

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Wei-De Toh, Singapore (SG); Yi-Chin Tang, New Taipei (TW)

(73) Assignees: ZYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 353 days.

(21) Appl. No.: 14/602,292

(22) Filed: Jan. 22, 2015

(65) Prior Publication Data

US 2016/0185042 A1 Jun. 30, 2016

(30) Foreign Application Priority Data

Dec. 29, 2014 (CN) .......................... 2014 1 0834954

(51) Int. Cl.
 *B29C 67/00* (2017.01)
 *B29C 64/106* (2017.01)
 *B29C 64/20* (2017.01)
 *B33Y 30/00* (2015.01)

(52) U.S. Cl.
 CPC ............ *B29C 64/106* (2017.08); *B29C 64/20* (2017.08); *B33Y 30/00* (2014.12)

(58) Field of Classification Search
 CPC ............ B29C 67/0085; B29C 67/0055; B29C 64/106; B29C 64/20
 See application file for complete search history.

(56) References Cited

U.S. PATENT DOCUMENTS

| | | | |
|---|---|---|---|
| 7,604,470 B2 | 10/2009 | LaBossiere et al. |
| 7,625,200 B2 | 12/2009 | Leavitt |
| 8,033,811 B2 | 10/2011 | Swanson et al. |

(Continued)

*Primary Examiner* — Yogendra Gupta
*Assistant Examiner* — Emmanuel S Luk
(74) *Attorney, Agent, or Firm* — JCIPRNET

(57) ABSTRACT

A printing head assembly including a fixing member, two nozzle heads, two driving units, two position-limiting members, and two position-restoring members is provided. Each nozzle head has a filament connection tube and a material extrusion port respectively penetrating through the fixing member, wherein the filament connection tube has a position-limiting portion. The driving units drive the corresponding filaments to feed into the corresponding nozzle heads. The position-limiting members are respectively disposed between the corresponding driving unit and the fixing member, and are connected to the corresponding filament connection tubes. The position-restoring members are respectively disposed between the corresponding position-limiting member and the fixing member. Each of the filament connection tubes respectively leans against the fixing member through the corresponding position-limiting portion or the corresponding position-limiting member, so as to limit the material extrusion port of each nozzle head to move between a first height level and a second height level.

13 Claims, 6 Drawing Sheets

(56) References Cited

U.S. PATENT DOCUMENTS

| | | | | |
|---|---|---|---|---|
| 8,827,684 B1* | 9/2014 | Schumacher | B29C 67/0055 | 264/308 |
| 9,205,690 B2* | 12/2015 | Leavitt | B29C 67/0055 | |
| 9,238,329 B2* | 1/2016 | Swanson | B29C 67/0055 | |
| 9,314,970 B2* | 4/2016 | Elsworthy | B29C 67/0059 | |
| 9,469,071 B2* | 10/2016 | Douglass | B29C 67/0055 | |
| 2007/0228590 A1* | 10/2007 | LaBossiere | B29C 67/0055 | 264/40.1 |
| 2008/0317894 A1* | 12/2008 | Turley | B29C 47/0877 | 425/226 |
| 2009/0035405 A1* | 2/2009 | Leavitt | B29C 47/0021 | 425/97 |
| 2010/0021580 A1* | 1/2010 | Swanson | B29C 31/042 | 425/132 |
| 2012/0164330 A1* | 6/2012 | Swanson | B29C 67/0055 | 427/258 |
| 2014/0088751 A1* | 3/2014 | Pridoehl | B29B 7/94 | 700/119 |
| 2014/0159284 A1* | 6/2014 | Leavitt | B29C 67/0055 | 264/401 |
| 2014/0244208 A1* | 8/2014 | Paulsen | E01C 19/004 | 702/150 |
| 2015/0037446 A1* | 2/2015 | Douglass | B29C 67/0055 | 425/131.1 |
| 2015/0076739 A1* | 3/2015 | Batchelder | B29C 67/0085 | 264/401 |
| 2015/0096717 A1* | 4/2015 | Batchelder | B29C 67/00 | 165/64 |
| 2015/0108677 A1* | 4/2015 | Mark | B29C 67/0055 | 264/138 |
| 2015/0140150 A1* | 5/2015 | Schmehl | B33Y 10/00 | 425/150 |
| 2015/0147427 A1* | 5/2015 | Lundwall | B29C 67/0085 | 425/375 |
| 2015/0165691 A1* | 6/2015 | Mark | B29C 67/0088 | 700/98 |
| 2015/0183161 A1* | 7/2015 | Molinari | B29C 67/0085 | 425/375 |
| 2015/0183167 A1* | 7/2015 | Molinari | B29C 67/0088 | 425/167 |
| 2015/0190967 A1* | 7/2015 | Stava | B29C 67/0088 | 427/256 |
| 2015/0251353 A1* | 9/2015 | Rodgers | B29C 67/0055 | 264/406 |
| 2015/0283751 A1* | 10/2015 | O'Neil | B29C 47/043 | 264/308 |
| 2015/0314531 A1* | 11/2015 | Mark | B29C 67/0074 | 264/241 |
| 2015/0328837 A1* | 11/2015 | Ventolina Cordero | B29C 67/0085 | 425/132 |
| 2016/0059492 A1* | 3/2016 | Lee | B29C 67/0088 | 425/145 |
| 2016/0176120 A1* | 6/2016 | Skubic | B29C 67/0055 | 425/376.1 |
| 2016/0192741 A1* | 7/2016 | Mark | A43B 17/003 | 36/43 |
| 2016/0236408 A1* | 8/2016 | Wolf | B29C 67/0055 | |
| 2016/0263823 A1* | 9/2016 | Espiau | B29C 67/0055 | |
| 2016/0311162 A1* | 10/2016 | Liu | B29C 67/0055 | |
| 2016/0368218 A1* | 12/2016 | Cruz | B29C 67/0085 | |

* cited by examiner

PRINTING HEAD ASSEMBLY

CROSS-REFERENCE TO RELATED APPLICATION

This application claims the priority benefit of China application serial no. 201410834954.2, filed on Dec. 29, 2014. The entirety of the above-mentioned patent application is hereby incorporated by reference herein and made a part of this specification.

BACKGROUND

Technical Field

The invention relates to a printing head assembly, and particularly relates to a printing head assembly having at least two nozzle heads.

Related Art

In recent years, along with development of technology, many methods for constructing a physical three-dimensional (3D) model by using an additive manufacturing technology such as a layer-by-layer model construction are developed. Generally, the additive manufacturing technology is to convert design data of the 3D model constructed by using software such as computer aided design (CAD) into a plurality of successively stacked thin (quasi-2D) cross-sectional layers. Meanwhile, many technical means used for forming the thin cross-sectional layers are provided. For example, a printing head assembly of a 3D printing device can move above a platform along an XY-plane according to spatial coordinates XYZ constructed by the design data of the 3D model, such that a printing material forms a correct shape of the cross-sectional layer, and then the printing head is driven to move along a Z-axis layer-by-layer, such that the cross-sectional layers are gradually stacked, and a 3D object is formed after the printing material is cured layer-by-layer.

There is a plurality of methods for forming the printing material on the platform, and one method is to fabricate the printing material into a filament, and a driving unit is used to push the filament into a heating type nozzle head. The filament is heated into a molten state in the nozzle head, and is then squeezed out from the nozzle head, such that the printing material is stacked on the platform layer-by-layer to form the 3D object. Moreover, some printing devices may also adopt a printing head assembly having two nozzle heads, and in collaboration with filaments of different colors, thus the 3D object produced by the printing device may have a plurality of colors. In the commonly used printing head assembly, height levels of the two nozzle heads are generally the same. However, when the printing head assembly conducts printing through one of the nozzle heads in collaboration with the corresponding filament, another non-used nozzle head located at the same height level or the filament presenting a molten state therein is liable to contact the 3D object to cause a flaw of the 3D object. Therefore, a printing effect of the printing head assembly is poor.

SUMMARY

The invention is directed to a printing head assembly, in which each of nozzle heads is capable of automatically stretching out and drawing back, so as to achieve a good printing effect.

The invention provides a printing head assembly, which is adapted to drive at least two filaments to form on a base layer-by-layer to construct a three-dimensional (3D) object. The printing head assembly includes a fixing member, at least two nozzle heads, at least two driving units, at least two position-limiting members, and at least two position-restoring members. The fixing member has an inlet side and an outlet side opposite to each other. The nozzle heads are respectively disposed at the outlet side of the fixing member. Each of the nozzle heads has a filament connection tube and a material extrusion port respectively penetrating through the fixing member, wherein the filament connection tube has a position-limiting portion. The driving units are respectively disposed at the inlet side of the fixing member, and respectively drive the corresponding filament to feed into the material extrusion port of the corresponding nozzle head from the corresponding filament connection tube through the fixing member. The position-limiting members are respectively disposed between the corresponding driving unit and the fixing member, and are connected to the corresponding filament connection tubes. The position-restoring members are respectively disposed between the corresponding position-limiting member and the fixing member, and are located on the corresponding filament connection tube. Each of the filament connection tubes respectively leans against the fixing member through the corresponding position-limiting portion or the corresponding position-limiting member, so as to limit the material extrusion port of each of the nozzle heads to move between a first height level and a second height level through the corresponding driving unit and the corresponding position-restoring member.

In an embodiment of the invention, when the corresponding filament is driven by the corresponding driving unit to move into the corresponding nozzle head, the filament pushes the nozzle head to move until the corresponding filament connection tube leans against the fixing member through the corresponding position-limiting member, so as to limit the material extrusion port of the nozzle head to correspond to the second height level.

In an embodiment of the invention, when the corresponding filament stops moving into the corresponding nozzle head, the corresponding driving unit drives the filament to move oppositely, so as to drive the nozzle head to move oppositely relative to the fixing member until the corresponding filament connection tube leans against the fixing member through the corresponding position-limiting portion, such that the material extrusion port corresponds to the first height level.

In an embodiment of the invention, when the corresponding filament stops moving into the corresponding nozzle head, the corresponding position-restoring member releases a position-restoring force to drive the nozzle head to move oppositely relative to the fixing member until the corresponding filament connection tube leans against the fixing member through the corresponding position-limiting portion, such that the material extrusion port corresponds to the first height level.

In an embodiment of the invention, each of the driving units includes a motor, a driving wheel and a passive wheel. The driving wheel is connected to the motor. The passive wheel is disposed at a side of the driving wheel, and the corresponding filament is clamped between the driving wheel and the passive wheel. When the motor drives the driving wheel to rotate along a clock direction, the driving wheel drives the passive wheel to rotate opposite to the clock direction, such that the driving wheel and the passive wheel drive the filament to move into the corresponding nozzle head.

In an embodiment of the invention, each of the nozzle heads includes a heating portion. The heating portion and the filament connection tube are connected to each other, and are respectively located at two opposite sides of the fixing member. The corresponding filament moves into the nozzle head from the filament connection tube, and is squeezed out from the material extrusion port after being heated into a molten state at the heating portion.

In an embodiment of the invention, the fixing member includes a cooling assembly, so as to avoid heat generated by the heating portion from transmitting to the filament connection tube.

In an embodiment of the invention, the position-limiting portion of each of the filament connection tubes and the corresponding position-limiting member are respectively located at two opposite sides of the fixing member. After the corresponding filament is moved into the nozzle head, the nozzle head is moved relative to the fixing member until the corresponding filament connection tube leans against the fixing member through the position-limiting member, such that the material extrusion port corresponds to the second height level, and the at least two nozzle heads have a height difference therebetween. When the corresponding filament stops moving into the corresponding nozzle head, the nozzle head is moved oppositely relative to the fixing member until the corresponding filament connection tube leans against the fixing member through the position-limiting portion, such that the material extrusion port corresponds to the first height level.

In an embodiment of the invention, the second height level is lower than the first height level, and the printing head assembly conducts printing by using the corresponding filament and the nozzle head with the material extrusion port corresponding to the second height level.

In an embodiment of the invention, each of the position-limiting members has a containing space. The position-limiting member is fixed to the corresponding filament connection tube in a manner that the containing space faces the fixing member, and the corresponding position-restoring member is disposed in the corresponding containing space and is located on the corresponding filament connection tube.

In an embodiment of the invention, the nozzle heads are arranged in parallel to each other along a horizontal direction, and the driving units, the position-limiting members and the position-restoring members are respectively disposed corresponding to the nozzle heads.

In an embodiment of the invention, the nozzle heads are configured surrounding a vertical direction serving as an axis, and the driving units, the position-limiting members and the position-restoring members are respectively configured corresponding to the nozzle heads.

In an embodiment of the invention, the fixing member includes at least two fixing portions separated from each other. The fixing portions are located on a same horizontal reference plane, and respectively correspond to the nozzle heads.

In an embodiment of the invention, each of the position-restoring members includes a spring.

According to the above descriptions, the printing head assembly of the invention adopts at least two nozzle heads, and when the printing head assembly does not conduct printing, the material extrusion ports of the two nozzle heads are located at the first height level, and when the printing head assembly conducts printing through one of the nozzle heads, the corresponding driving unit drives the corresponding filament to move into the nozzle head. Now, during the process that the filament moves into the nozzle head, the filament pushes the nozzle head to move relative to the fixing member until the position-limiting member leans against the fixing member, and the material extrusion port corresponds to the second height level, such that the two nozzle heads have a height difference therebetween. When the nozzle head completes printing, the filament stops moving into the nozzle head, and the nozzle head can move oppositely relative to the fixing member until the material extrusion port corresponds to the first height level. In this way, each of the nozzle heads of the printing head assembly in the invention can automatically stretch out and draw back, so as to achieve a good printing effect.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
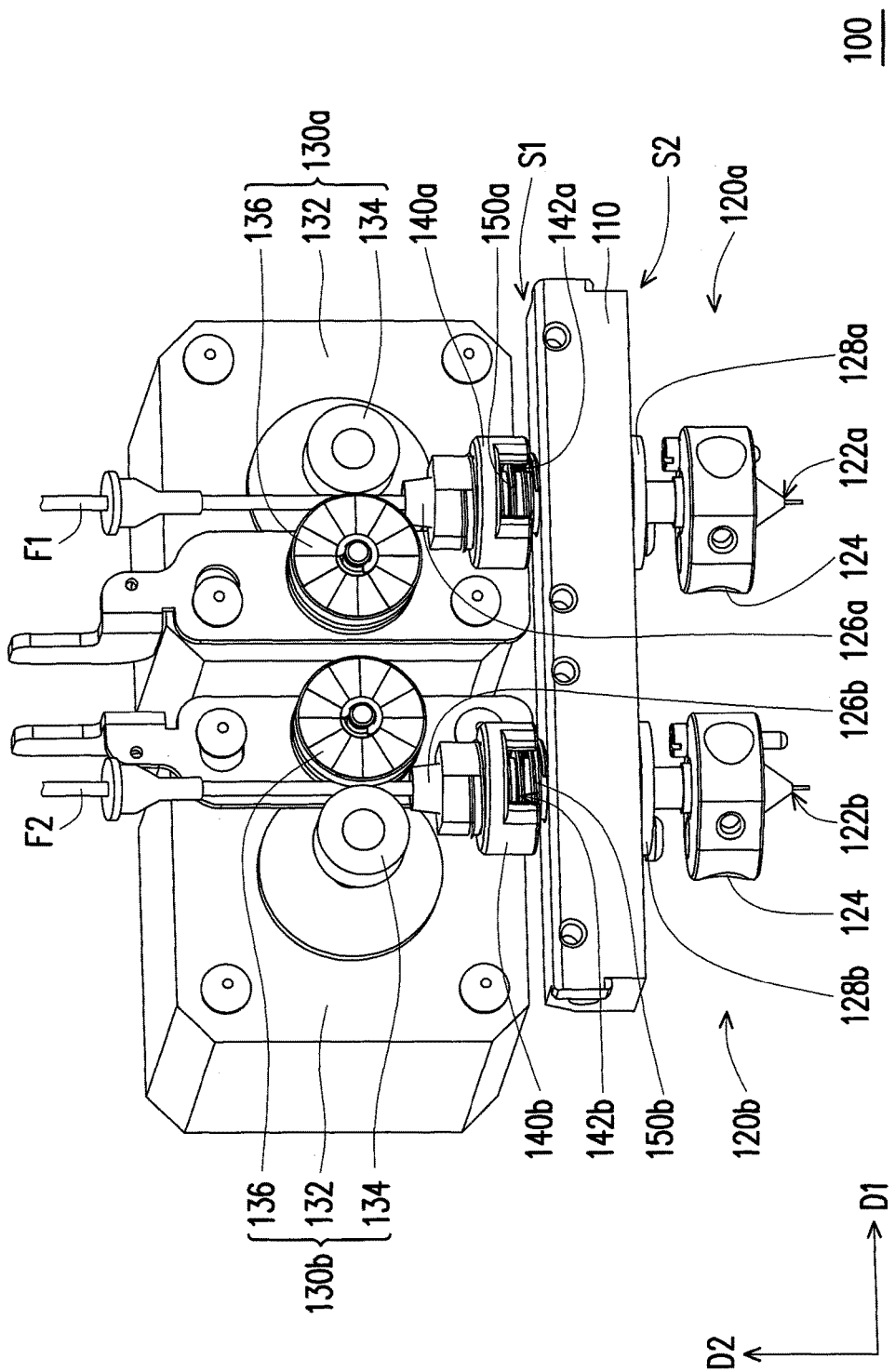
FIG. 1 is a schematic diagram of a printing head assembly according to an embodiment of the invention.
Figure 2:
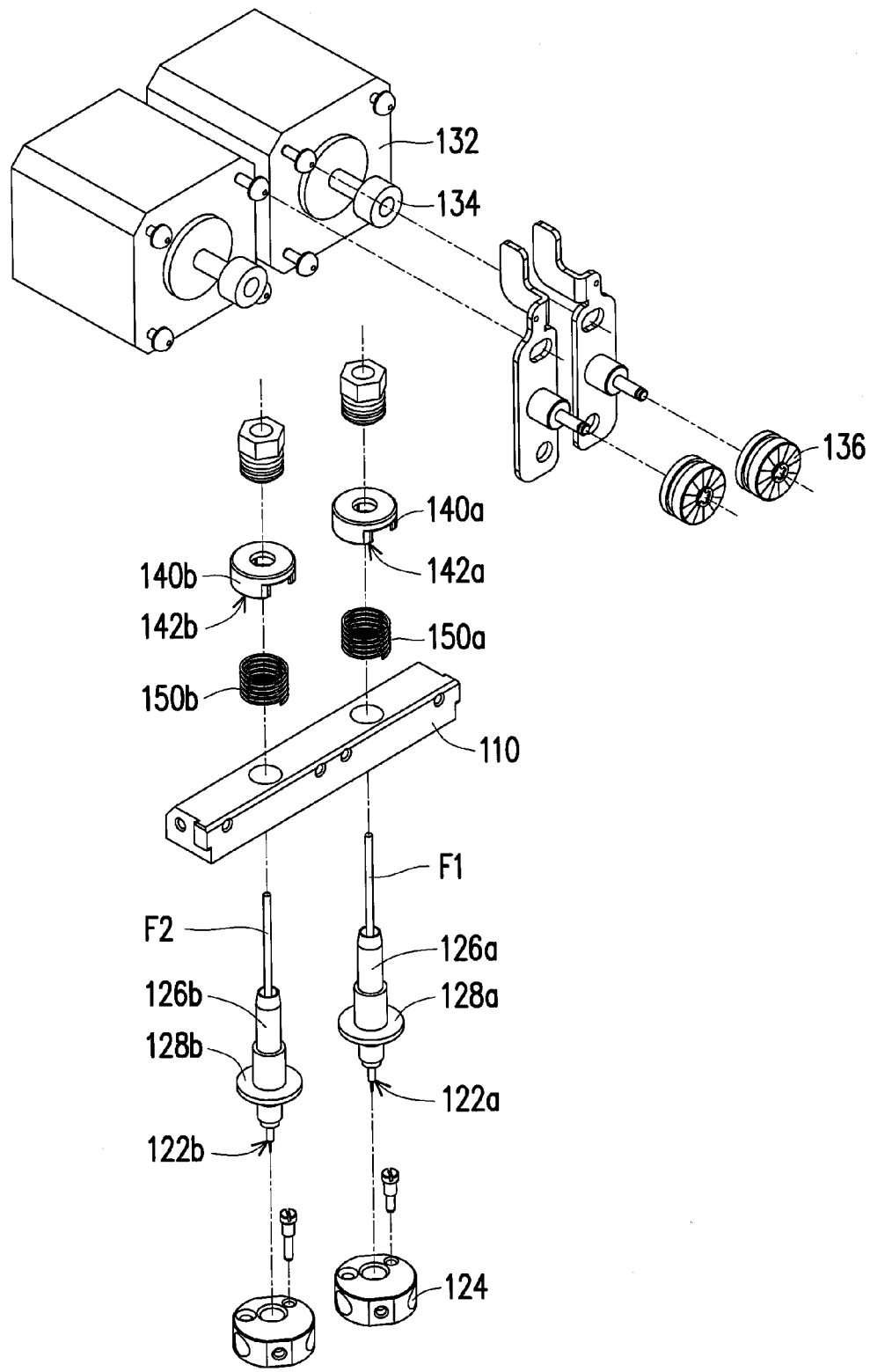
FIG. 2 is an exploded view of the printing head assembly of FIG. 1.

FIG. 1 is a schematic diagram of a printing head assembly according to an embodiment of the invention. FIG. 2 is an exploded view of the printing head assembly of FIG. 1. Referring to FIG. 1 and FIG. 2, in the present embodiment, the printing head assembly 100 is adapted for a three-dimensional (3D) printing device that is now shown, and drives at least two filaments F1 and F2 to form on a base (not shown) layer-by-layer, so as to construct a 3D object. The printing head assembly 100 includes a fixing member 110, two nozzle heads 120a and 120b, two driving units 130a and 130b, two position-limiting members 140a and 140b, and two position-restoring members 150a and 150b. The fixing member 110 has an inlet side S1 and an outlet side S2 opposite to each other. The two nozzle heads 120a and 120b penetrate through the fixing member 110, and are adapted to move relative to the fixing member 110. The two nozzle heads 120a and 120b are respectively disposed at the outlet side S2 of the fixing member 110, wherein the nozzle heads 120a and 120b respectively have filament connection tubes 126a, 126b and material extrusion ports 122a, 122b respectively penetrating through the fixing member 110, and the filament connection tubes 126a and 126b respectively have position-limiting portions 128a and 128b. In other words, the nozzle heads 120a and 120b can be considered that penetrate through the fixing member 110 via the corresponding filament connection tubes 126a and 126b, so that the filament connection tubes 126a and 126b extend from the outlet side S2 to the inlet side S1. The driving units 130a and 130b are respectively disposed at the inlet side S1 of the fixing member 110, and respectively drive the corresponding filaments F1 and F2 to feed into the material extrusion ports 122a and 112b of the corresponding nozzle heads 120a and 120b from the filament connection tubes 126a and 126b of the corresponding nozzle heads 120a and 120b through the fixing member 110. In this way, the printing head assembly 100 is adapted for a 3D printing device that is not shown, and the filaments F1 and F2 are driven by the above members to form on the base (not shown) layer-by-layer to construct a 3D object.

To be specific, the printing head assembly 100 can be applied to a 3D printing device for driving the filaments F1 and F2 to form on a base layer-by-layer to construct the 3D object. The printing head assembly 100 preferably prints two printing materials having different properties, for example, the filaments F1 and F2 with different colors are adopted as the printing materials, or the filaments F1 and F2 can respectively be forming materials or supporting materials. The printing head assembly 100 can apply one of the nozzle heads 120a and 120b to conduct printing according to an actual requirement. For example, when the printing head assembly 100 applies the nozzle head 120a to conduct printing, the corresponding driving unit 130a can drive the corresponding filament F1 to move into the nozzle head 120a, such that the filament F1 serves as the printing material to implement the printing. Similarly, when the printing head assembly 100 applies the nozzle head 120b to conduct printing, the corresponding driving unit 130b can drive the corresponding filament F2 to move into the nozzle head 120b, such that the filament F2 serves as the printing material to implement the printing. In case that an influence of an assembling tolerance is not considered, height levels of the nozzle heads 120a and 120b are generally designed to be the same. However, when the printing head assembly 100 applies one of the nozzle heads, for example, the nozzle head 120a in collaboration of the corresponding filament F1 to conduct printing, the other nozzle head 120b located adjacent to the nozzle head 120a is liable to interfere the 3D object constructed by the nozzle head 120a, for example, contact the 3D object during the process when the printing head assembly 100 conducts printing through the nozzle head 120a, or the filament F2 in the nozzle head 120b contacts the 3D object to produce a flaw. Therefore, in the present embodiment, the position-limiting members 140a and 140b and the position-restoring members 150a and 150b are designed, such that the nozzle heads 120a and 120b of the printing head assembly 100 can automatically stretch out and draw back according to a printing state, so as to achieve a good printing effect.

In the present embodiment, the position-limiting elements 140a and 140b are respectively disposed between the corresponding driving units 130a and 130b and the fixing member 110, and are connected to the corresponding filament connection tubes 126a and 126b. Further, the position-limiting members 140a and 140b are fixed to the corresponding filament connection tubes 126a and 126b, and are located at the inlet side S1 of the fixing member 110. In this way, the position-limiting portions 128a, 128b of the filament connection tubes 126a and 126b and the corresponding position-limiting members 140a and 140b are respectively located at two opposite sides of the fixing member 110. Moreover, the position-restoring members 150a and 150b are respectively disposed between the fixing member 110 and the corresponding position-limiting members 140a and 140b, and are located on the corresponding filament connection tubes 126a and 126b. Further, each of the position-limiting members 140a and 140b is substantially a cover, and has a containing space 142. The position-limiting members 140a and 140b are fixed to the corresponding filament connection tubes 126a and 126b in a manner that the containing spaces 142a and 142b thereof face the fixing member 110. Moreover, the position-restoring members 150a and 150b are, for example, springs, which are disposed in the corresponding containing spaces 142a and 142b and located between the fixing member 110 and the corresponding position-limiting members 140a and 140b, and wrap the corresponding filament connection tubes 126a and 126b. However, the shape of the position-limiting members 140a and 140b and the type of the position-limiting members 150a and 150b are not limited by the invention, which can be adjusted according to an actual requirement.

Therefore, when the corresponding driving units 130a and 130b drive the corresponding filaments F1 and F2 to move into or stop moving into the corresponding nozzle heads 120a and 120b, the filaments F1 and F2 drive the nozzle heads 120a and 120b to move relative to the fixing member 110, or when the nozzle heads 120a and 120b move relative to the fixing member 110 through the corresponding position-restoring members 150a and 150b, the filament connection tubes 126a and 126b respectively lean against the fixing member 110 through the corresponding position-limiting portions 128a and 128b or the corresponding position-limiting member 140a and 140b, so as to limit the material extrusion ports 122a and 122b of the nozzle heads 120a and 120b to move between a first height level H1 and a second height level H2 (shown in FIG. 3A to FIG. 3C) through the corresponding driving units 130a and 130b and the corresponding position-restoring members 150a and 150b. The above implementation is described below with reference of FIG. 3A to FIG. 3C.

Figure 3A:
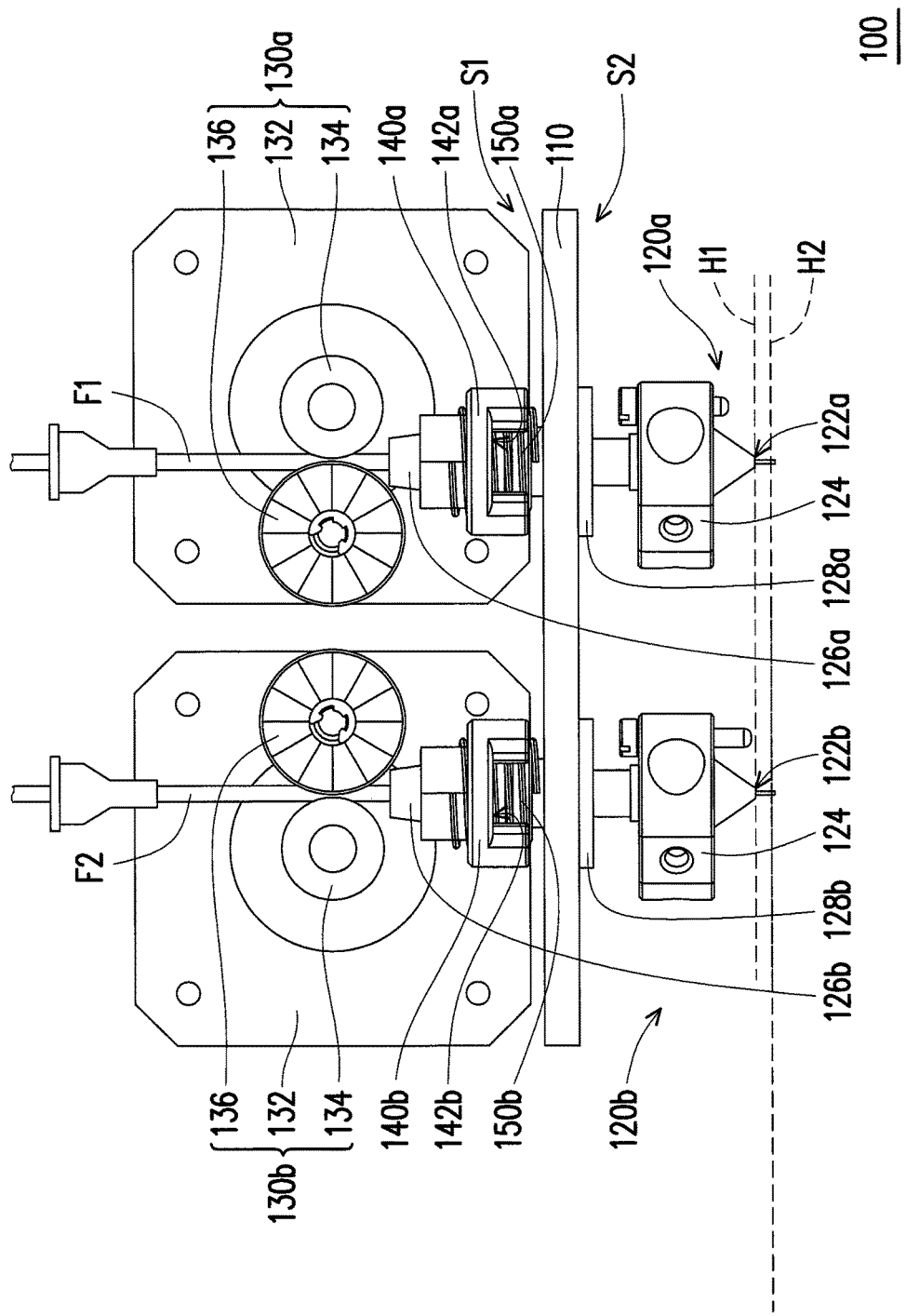
FIG. 3A to FIG. 3C are schematic diagrams illustrating an operation flow of the printing head assembly of FIG. 1.
Figure 3B:
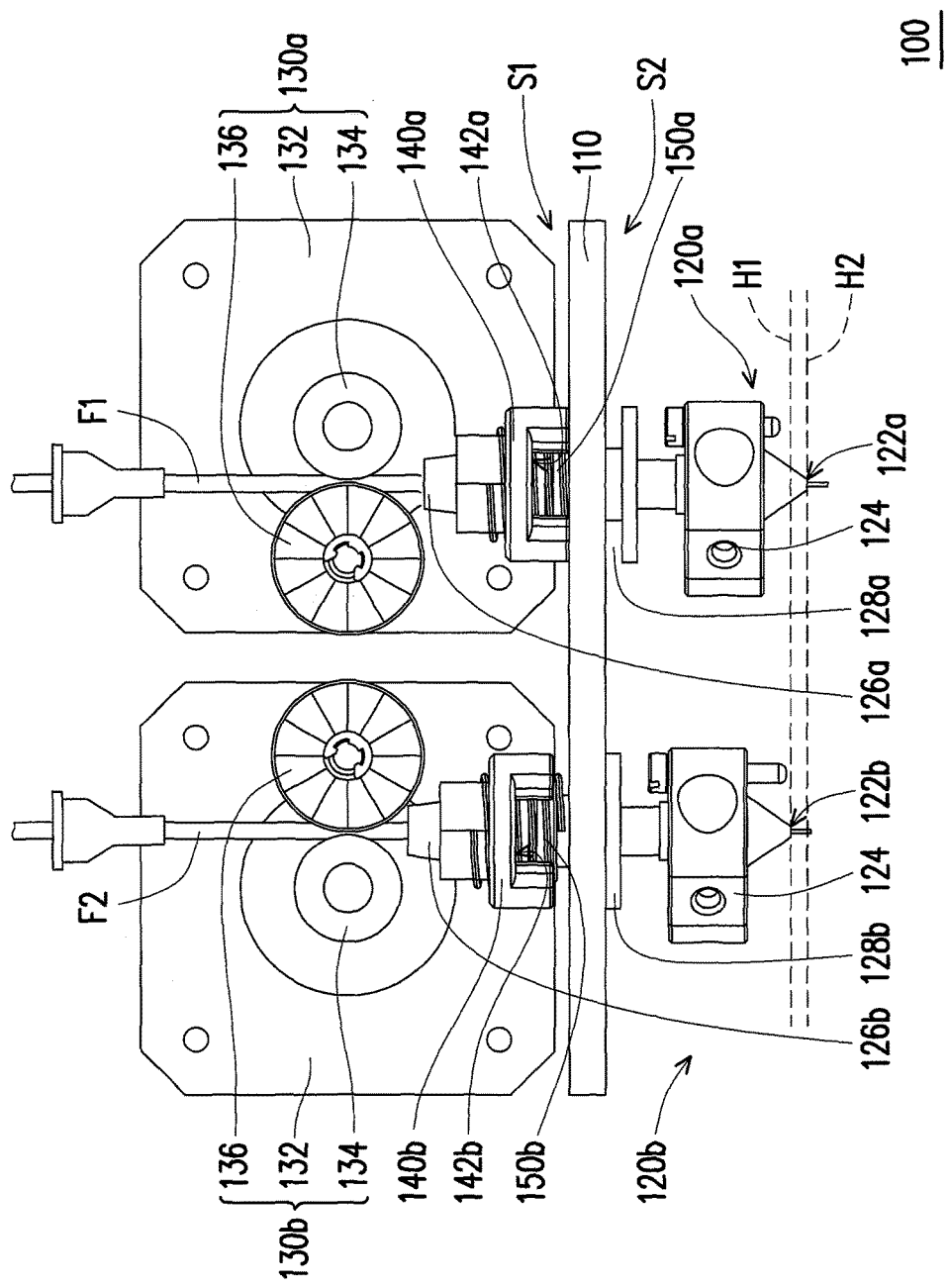
Figure 3C:
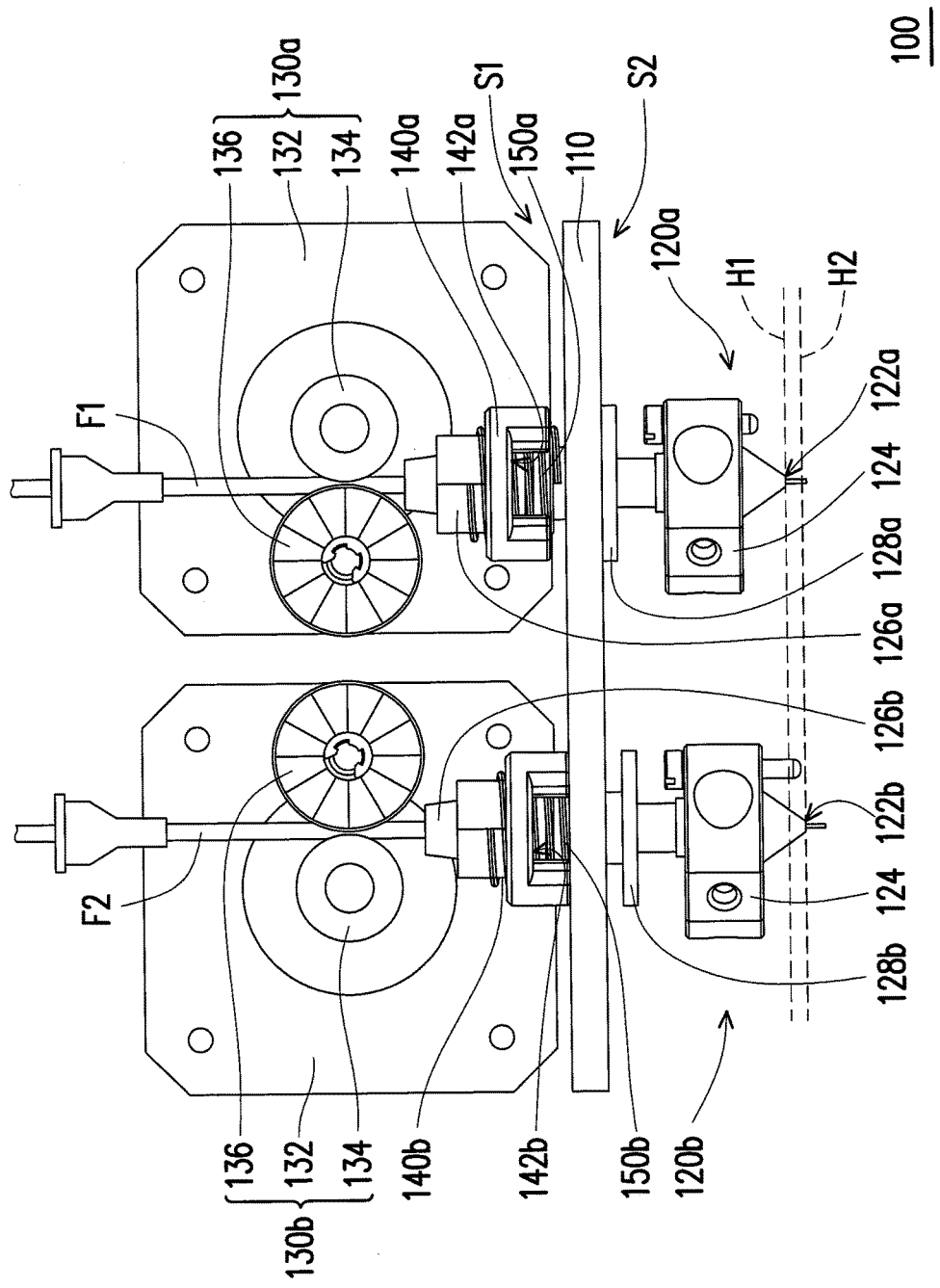

FIG. 3A to FIG. 3C are schematic diagrams illustrating an operation flow of the printing head assembly of FIG. 1. Referring to FIG. 1, FIG. 3A and FIG. 3B, in the present embodiment, when the printing head assembly 100 does not conduct printing, the material extrusion ports 122a and 122b of the two nozzle heads 120a and 120b are located at the first height level H1, as shown in FIG. 3A. Now, the filament connection tubes 126a and 126b respectively lean against the fixing member 110 through the corresponding position-limiting portions 128a and 128b (which are located at the outlet side S2), so as to limit the material extrusion ports 122a and 122b of the two nozzle heads 120a and 120b to the first height level H1. When the printing head assembly 100 conducts printing through one of the nozzle heads, for example, the nozzle head 120a, the corresponding driving unit 130a can drive the corresponding filament F1 to move into the nozzle head 120a to conduct printing. For example, the printing head assembly 100 adopts the nozzle head 120a to conduct printing, when the corresponding filament F1 is driven by the corresponding driving unit 130a to move into the corresponding nozzle head 120a, the filament F1 pushes the nozzle head 120a during the process of moving into the nozzle head 120a. The filament connection tube 126a of the nozzle head 120a has a channel therein to facilitate the filament F1 to penetrate there thorough, and the filament F1 in the nozzle head 120a contacts an inner wall of the channel, so as to push the nozzle head 120a to move towards a moving direction of the filament F1. The nozzle head 120a is pushed by the filament F1 to move relative to the fixing member 110 until the corresponding filament connection tube 126a leans against the fixing member 110 through the corresponding position-limiting member 140a (which is located at the inlet side S1), so as to limit the material extrusion port 122a of the nozzle head 120a to the second height level H2. In other words, after the corresponding filament F1 is moved into the corresponding nozzle head 120a, the nozzle head 120a is moved relative to the fixing member 110 until the corresponding filament connection tube 126a leans against the fixing member 110 through the position-limiting member 140a, such that the material extrusion port 122a corresponds to the second height level H2. Now, the two nozzle heads 120a and 120b have a height difference therebetween. Further, the second height level H2 is lower than the first height level H1, such that the nozzle head 120a with the material extrusion port 122a corresponding to the second height level H2 and the nozzle head 120b with the material extrusion port 122b still corresponding to the first height level H1 have a height difference, and the printing head assembly 100 conducts printing by using the nozzle head 120a with a lower height (the material extrusion port 122a thereof corresponding to the second height level H2) and the filament F1, as shown in FIG. 3B.

Further, in the present embodiment, each of the driving units 130a and 130b includes a motor 132, a driving wheel 134 and a passive wheel 136. Taking the driving unit 130a as an example, the driving wheel 134 is connected to the motor 132. The passive wheel 136 is disposed at a side of the driving wheel 134, and the corresponding filament F1 is clamped between the driving wheel 134 and the passive wheel 136. In other words, the driving wheel 134 is directly driven by the motor 132 to rotate, and the passive wheel 136 is driven to rotate while the driving wheel 134 rotates. In this way, when the motor 132 drives the corresponding driving wheel 134 to rotate along a clock direction (for example, to rotate along a counter-clockwise direction), the driving wheel 124 drives the passive wheel 136 to rotate opposite to the clock direction (for example, to rotate along a clockwise direction), such that the driving wheel 134 and the passive wheel 136 drive the filament F1 to move downwards to enter the corresponding nozzle head 120a. Moreover, each of the nozzle heads 120a and 120b includes a heating portion 124. Taking the nozzle head 120a as an example, the heating portion 124 and the filament connection tube 126a are connected to each other, and are respectively located at two opposite sides of the fixing member 110. In other words, the nozzle head 120a penetrates through the fixing member 110 by the filament connection tube 126a, so as to make the heating portion 124 and the position-limiting portion 128a are located at the outlet side S2, and the corresponding position-limiting member 140a is located at the inlet side S1, such that the position of the nozzle head 120a is limited when the nozzle head 120a moves relative to the fixing member 110. In this way, the corresponding filament F1 is driven by the driving unit 130a according to the aforementioned driving method, and is moved into the nozzle head 120a through an opening of the filament connection tube 126a, and is further heated by the heating portion 124 into a molten state. Thereafter, the post portion of the filament F1 is driven by the driving unit 130a to continuously move into the nozzle head 120a, and the portion of the filament F1 heated into the molten state is squeezed out from the corresponding material extrusion port 122a.

Therefore, in the present embodiment, the part of the filament F1 that is not moved into the nozzle head 120a presents a solid state and can be driven by the driving wheel 134 and the passive wheel 136, and can move into the filament connection tube 126a to push the nozzle head 120a to move relative to the fixing member 110. Comparatively, the part of the filament F1 moved into the nozzle head 120a is heated into the molten state at the heating portion 124, and is continuously pushed by the post portion of the filament F1, and is further squeezed out from the corresponding material extrusion port 122a, such that the filament F1 is stacked on the aforementioned base layer-by-layer to construct a 3D object. Therefore, in the present embodiment, the fixing member 110 may adopt a cooling assembly. In this way, besides that the fixing member 110 serves as a fixing mechanism, it can also avoid the heat generated by the heating portion 124 from transmitting to the filament connection tube 126a, so as to prevent the post portion of the filament F1 from being molten after entering the filament connection tube 126a and before entering the heating portion 124. Moreover, in other embodiments that are not shown, in the printing head assembly 100, a cooling fan or cooling fins, etc. corresponding to the nozzle head 120a can be disposed on the fixing member 110 or other fixing components according to an actual requirement, so as to avoid the post portion of the filament F1 from being molten after entering the filament connection tube 126a and before entering the heating portion 124.

Referring to FIG. 1, FIG. 3A and FIG. 3B, in the present embodiment, when the driving unit 130a drives the corresponding filament F1 to move into the corresponding nozzle head 120a, during the process of moving into the nozzle head 120a, the filament F1 pushes the nozzle head 120a to move until the corresponding position-limiting member 140a leans against the fixing member 110 and the material extrusion port 122a corresponds to the second height level H2, such that the two nozzle heads 120a and 120b have a height difference. In this way, the printing head assembly 100 conducts printing through the nozzle head 120a with the material extrusion port 122a corresponding to the second height level H2, and the nozzle head 120b with the material extrusion port 122b corresponding to the first height level H1 does not interfere the printing, so as to avoid producing a flaw on the 3D object printed by the printing head assembly 100. In other words, when the printing head assembly 100 conducts printing through the nozzle head 120a, since the two nozzle heads 120a and 120b have the height difference, the nozzle head 120b located at a higher position can avoid contacting the 3D object produced by the nozzle head 120a located at a lower position in collaboration with the filament F1, and can prevent the filament F2 with the molten state in the nozzle head 120b from contacting the 3D object to cause a flaw. Therefore, the printing head assembly 100 of the present embodiment has a good printing effect. Moreover, the nozzle head 120a intended to conduct the printing is pushed by the filament F1 to automatically move to the second height level H2 during a process that the driving unit 130a drives the corresponding filament F1 to feed in the filament connection tube 126a of the nozzle head 120a, such that the printing head assembly 100 of the present embodiment is unnecessary to configure an additional driving unit to achieve the effect of automatically stretching out the nozzle head 120a downward.

Moreover, in the present embodiment, besides that the nozzle heads 120a and 120b can be pushed by the filaments F1 and F2 to automatically stretch out downward when the corresponding driving units 130a and 130b drive the corresponding filaments F1 and F2, the nozzle heads 120a and 120b can also draw back upward after the printing is completed. Namely, taking the nozzle head 120a as an example, after the printing head assembly 100 completes the required printing operation through the nozzle head 120a in collaboration with the filament F1, the corresponding driving unit 130a can stop operation. When the corresponding filament F1 stops moving into the corresponding nozzle head 120a, the nozzle head 120a can move oppositely relative to the fixing member 110 until the corresponding filament connection tube 126a leans against the fixing member 110 through the corresponding position-limiting portion 128a, such that the material extrusion port 122a corresponds to the first height level H1 again, and a process thereof is shown as FIG. 3B to FIG. 3A.

To be specific, in the present embodiment, when the corresponding driving unit 130a drives the corresponding filament F1 to move into the corresponding nozzle head 120a to push the nozzle head 120a to move relative to the fixing member 110, the position-restoring member 150a disposed between the fixing member 110 and the corresponding position-limiting member 140a is deformed through the relative movement between the fixing member 110 and the position-limiting member 140a, such that the position-restoring member 150a accumulates a position-restoring force, and the position-restoring member 150a constantly drives the position-limiting member 140a to depart from the fixing member 110. Therefore, a driving force generated when the driving unit 130a drives the filament F1 to move into the nozzle head 120a is required to be greater than the position-restoring force in order to keep moving the filament F1 into the nozzle head 120a to conduct the printing. Thereafter, when the corresponding filament F1 stops moving into the corresponding nozzle head 120a, the filament F1 stops pushing the nozzle head 120a, such that the corresponding position-restoring member 150a releases the position-restoring force to drive the corresponding position-limiting member 140a fixed on the filament connection tube 126a to depart from the fixing member 110. In this way, the position-restoring member 150a can further drive the nozzle head 120a to move oppositely relative to the fixing member 110 until the corresponding filament connection tube 126a leans against the fixing member 110 through the corresponding position-limiting portion 128a, such that the material extrusion port 122a corresponds to the first height level H1 again. Therefore, through the design of the position-restoring member 150a, the nozzle head 120a can be automatically restored to is original state after completing the printing operation, i.e. moved to a position where the material extrusion port 122a corresponds to the first height level H1, and a process thereof is shown as FIG. 3B to FIG. 3A.

However, the nozzle head 120a of the present embodiment is not limited to automatically restoring its original state through the position-restoring member 150a after completing the printing operation. To be specific, in the present embodiment, since the filament F1 is driving by the corresponding driving unit 130a to move into the corresponding nozzle head 120a, the above process can be performed oppositely. Namely, when the corresponding filament F1 stops moving into the corresponding nozzle head 120a, the corresponding driving unit 130a drives the filament F1 to move oppositely, so as to drive the nozzle head 120a to move oppositely relative to the fixing member 110 until the corresponding filament connection tube 126a leans against the fixing member 110 through the corresponding position-limiting portion 128a, such that the material extrusion port 122a corresponds to the first height level H1 again. Further, when the corresponding filament F1 stops moving into the corresponding nozzle head 120a, the motor 132 can drive the aforementioned driving wheel 134 to rotate opposite to the clock direction (for example, to rotate along the clockwise direction), such that the driving wheel 134 drives the passive wheel 136 to rotate along the clock direction (for example, to rotate along the counter-clockwise direction). In this way, the driving wheel 134 and the passive wheel 136 drive the filament F1 to move upwards, such that the filament F1 can drive the nozzle head 120a to move oppositely relative to the fixing member 110 to a position where the material extrusion port 122a corresponds to the first height level H1 again.

Therefore, in the present embodiment, when the corresponding filament F1 is driven by the corresponding driving unit 130a to move into the corresponding nozzle head 120a, the nozzle head 120a can be pushed by the filament F1 to move relative to the fixing member 110 until the corresponding position-limiting member 140a (which is located at the inlet side S1) leans against the fixing member 110, such that the material extrusion port 122a corresponds to the second height level H2 to conduct the printing. After the corresponding filament F1 stops moving into the corresponding nozzle head 120a, the nozzle head 120a can be driven by the position-restoring force of the corresponding position-restoring member 150a or driven by the corresponding driving unit 130a to move oppositely relative to the fixing member 110 until the corresponding position-limiting portion 128a (which is located at the outlet side S2) leans against the fixing member 110, such that the material extrusion port 122a corresponds to the first height level H1 again. In other words, based on the design of configuring the position-limiting member 140a and the position-limiting portion 128a to the filament connection tube 126a, displacement of the nozzle head 120a relative to the fixing member 110 between the first height level H1 and the second height level H2 through the corresponding position-restoring member 150a and the corresponding driving unit 130a can be more accurate.

Similarly, referring to FIG. 1, FIG. 3A and FIG. 3C, in the present embodiment, when the printing head assembly 100 conducts the printing through the nozzle head 120b, the driving unit 130b drives the corresponding filament F2 to move into the corresponding nozzle head 120b to conduct the printing. To be specific, when the filament F2 is driven by the driving unit 130b to move into the nozzle head 120b, the filament F2 pushes the nozzle head 120b to move during the process of moving into the nozzle head 120b. The nozzle head 120b moves relative to the fixing member 110 until the corresponding filament connection tube 126b leans against the fixing member 110 through the position-limiting member 140b (which is located at the inlet side S1), and the material extrusion port 122b corresponds to the second height level H2, such that the two nozzle heads 120a and 120b have a height difference. In this way, the printing head assembly 100 conducts printing through the nozzle head 120b with the material extrusion port 122b corresponding to the second height level H2, and the nozzle head 120a with the material extrusion port 122a corresponding to the first height level H1 does not interfere the printing, so as to avoid producing a flaw on the 3D object. The process that the nozzle head 120b moves to a position where the material extrusion port 122b thereof corresponds to the second height level H2 may refer to the related description of the nozzle head 120a, and details thereof are not repeated.

Moreover, in the present embodiment, after the printing head assembly 100 completes the required printing operation through the nozzle head 120b in collaboration with the filament F2, the driving unit 130b stops driving the filament F2 to move into the nozzle head 120b. Thereafter, the nozzle head 120b can be driven by the position-restoring force of the corresponding position-restoring member 150b or driven by the corresponding driving unit 130b to move oppositely relative to the fixing member 110 until the corresponding position-limiting portion 128b (which is located at the outlet side S2) leans against the fixing member 110, such that the material extrusion port 122b corresponds to the first height level H1 again. A detailed operation process that the nozzle head 120b move oppositely to a position where the material extrusion port 122b thereof corresponds to the first height level H1 again may refer to the related description of the nozzle head 120a, and details thereof are not repeated.

Referring back to FIG. 1, in the present embodiment, the two nozzle heads 120a and 120b are arranged in parallel to each other along a horizontal direction D1, and the driving units 130a and 130b, the position-limiting members 140a and 140b, and the position-restoring members 150a and 150b are respectively disposed corresponding to the nozzle heads 120a and 120b. To be specific, the nozzle head 120a and the corresponding driving unit 130a, the position-limiting member 140a and the position-restoring member 150a can be regarded as a printing set, and the nozzle head 120b and the corresponding driving unit 130b, the position-limiting member 140b and the position-restoring member 150b can be regarded as another printing set. In this way, the nozzle heads 120a and 120b arranged in parallel to each other along the horizontal direction D1 can be regarded as the aforementioned printing sets arranged in parallel to each other along the horizontal direction D1. Therefore, in an embodiment that is not shown, when the printing head assembly adopts more nozzle heads (for example, three nozzle heads) to print more different types of filaments, numbers of the driving units, the position-limiting members and the position-restoring members are accordingly increased, and the nozzle heads and the corresponding driving units, the position-limiting members and the position-restoring members construct printing sets and are arranged in parallel to each other along the horizontal direction D1.

Moreover, in the present embodiment, the two nozzle heads 120a and 120b may be considered as being configured surrounding a vertical direction D2 serving as an axis, and the driving units 130a and 130b, the position-limiting members 140a and 140b and the position-restoring members 150a and 150b are respectively configured corresponding to the nozzle heads 120a and 120b. To be specific, referring to FIG. 1, the nozzle head 120a and the corresponding driving unit 130a, the position-limiting member 140a and the position-restoring member 150a can be regarded as a printing set, and the nozzle head 120b and the corresponding driving unit 130b, the position-limiting member 140b and the position-restoring member 150b can be regarded as another printing set. In this way, the nozzle heads 120a and 120b configured surrounding the vertical direction D2 serving as an axis can be substantially regarded as the aforementioned printing set configured surrounding the vertical direction D2 serving as an axis. Therefore, in an embodiment that is not shown, when the printing head assembly adopts more nozzle heads (for example, three nozzle heads) to print more different types of filaments, the numbers of the driving units, the position-limiting members and the position-restoring members are accordingly increased, and the nozzle heads and the corresponding driving units, the position-limiting members and the position-restoring members construct printing sets to be configured surrounding the vertical direction D2 serving as an axis. However, the arrangement of the nozzle heads is not limited by the invention, which can be adjusted according to an actual requirement.

Figure 4:
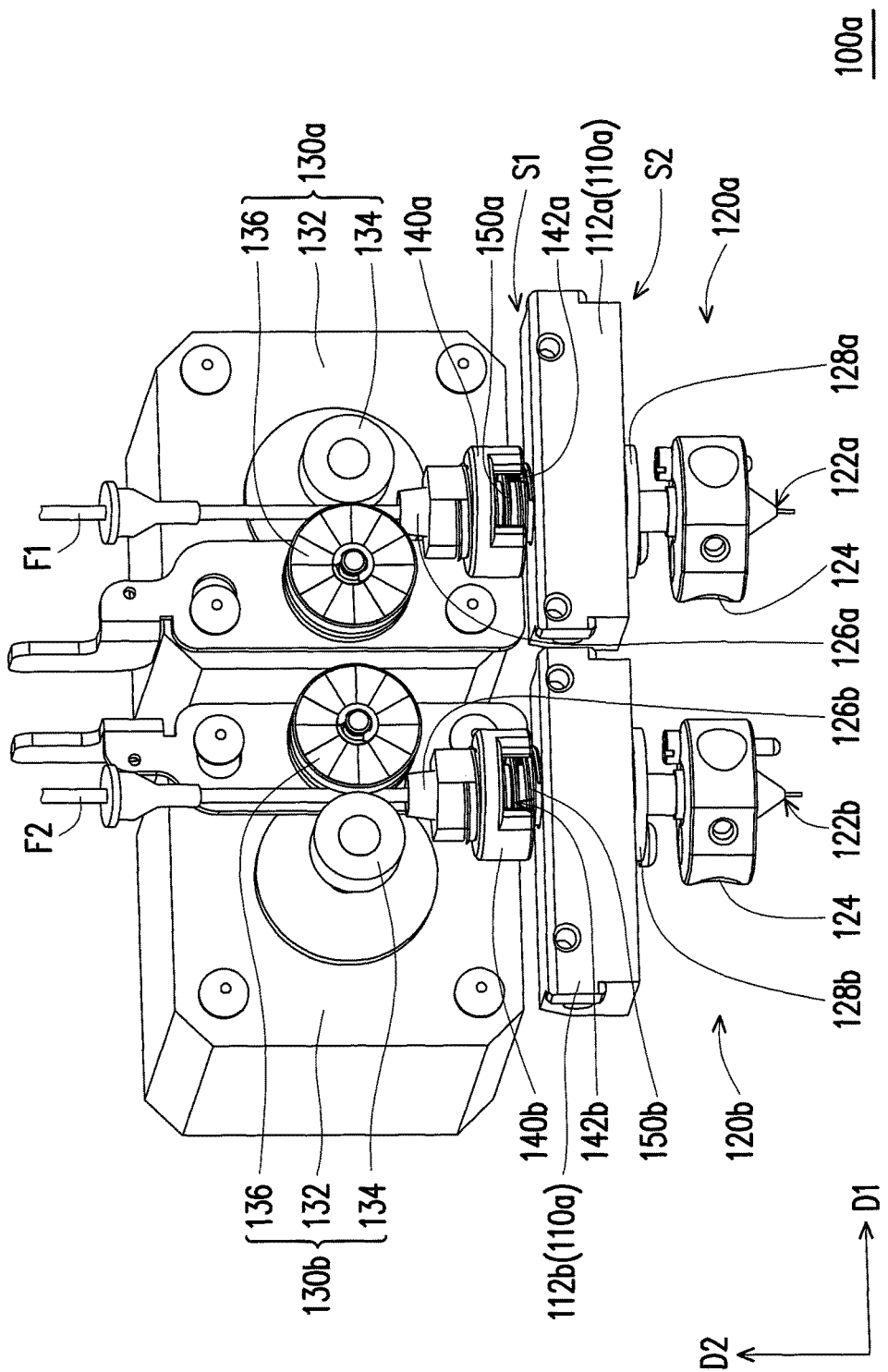
FIG. 4 is a schematic diagram of a printing head assembly according to another embodiment of the invention.

Moreover, in the present embodiment, since the printing head assembly 100 adopts at least two nozzle heads 120a and 120b, the fixing member 110 can be an independent member as shown in FIG. 3A. However, in other embodiments, the fixing member can also be separate members. For example, FIG. 4 is a schematic diagram of a printing head assembly according to another embodiment of the invention. Referring to FIG. 4, in the present embodiment, a main difference between the printing head assembly 100a and the aforementioned printing head assembly 100 is that the fixing member 110a of the printing head assembly 100a is separate members, which includes, for example, at least two fixing portions 112a and 112b separate from each other. The fixing portions 112a and 112b are located at a same horizontal reference plane, for example, fixed on another fixing member that is not shown and correspond to a same horizontal reference plane, and respectively correspond to the nozzle heads 120a and 120b, such that the nozzle heads 120a and 120b can take the corresponding fixing portions 112a and 112b as a moving reference. Similarly, when the printing head assembly of the other embodiment that is not shown adopts more nozzle heads, the number of the fixing portions is accordingly increased. Therefore, in the present embodiment, the fixing member 110 or 110a provides a fixing and moving reference, and can further provide a cooling function (for example, a cooling assembly is adopted to serve as the fixing member), though a composition of the fixing member 110 or 110a is not limited by the invention, which can be adjusted according to an actual requirement.

Referring to FIG. 1 to FIG. 3B, the printing head assembly 100 of the present embodiment can adopt one of the nozzle heads 120a and 120b in collaboration with the corresponding filament F1 or F2 to conduct printing according to an actual requirement, wherein the nozzle head 120a or 120b intend to conduct the printing is pushed downward to move to the second height level H2 during a process that the corresponding filament F1 or F2 is moved in, such that the two nozzle heads 120a and 120b have a height difference. After the nozzle head 120a or 120b completes the printing, the nozzle head 120a or 120b can be driven to move to the initial position (the first height level H1) through the position-restoring force of the corresponding position-restoring member 150a or 150b or through the filament F1 or F2 driven by the corresponding driving unit 130a or 130b. In this way, each of the nozzle heads 120a and 120b of the printing head assembly 100 of the present embodiment can automatically stretch out or draw back according to a printing state, such that the printing head assembly 100 has a good printing effect. Moreover, the printing head assembly 100 of the present embodiment drives the filament F1 and F2 to move into the nozzle heads 120a and 120b through the driving units 130a and 130b, and the filaments F1 and F2 pushes the nozzle heads 120a and 120b to move to the second height level H2, and the printing head assembly 100 restores positions of the nozzle heads 120a and 120b for moving to the first height level H1 through the driving units 130a and 130b or the position-restoring members 150a and 150b, such that the printing head assembly 100 of the present embodiment is unnecessary to be configured with other driving units for drawing back the nozzle heads 120a and 120b, and the cost is saved.

In summary, the printing head assembly of the invention adopts at least two nozzle heads, and when the printing head assembly does not conduct printing, the material extrusion ports of the two nozzle heads are located at the first height level, and when the printing head assembly conducts printing through one of the nozzle heads, the corresponding driving unit drives the corresponding filament to move into the nozzle head. Now, during the process that the filament moves into the nozzle head, the filament pushes the nozzle head to move relative to the fixing member until the position-limiting member leans against the fixing member, and the material extrusion port corresponds to the second height level, such that the two nozzle heads have a height difference therebetween. When the nozzle head completes printing, the filament stops moving into the nozzle head, and the nozzle head can move oppositely relative to the fixing member until the material extrusion port corresponds to the first height level. Therefore, when the printing head assembly conducts printing through the nozzle head with the material extrusion port corresponding to the second height level, the nozzle head with the material extrusion port corresponding to the first height level does not interfere the printing, so as to avoid producing a flaw on the 3D object printed by the printing head assembly. In this way, each of the nozzle heads in the printing head assembly in the invention can automatically stretch out and draw back, so as to achieve a good printing effect. Moreover, it is unnecessary to additionally configure driving units used for drawing back the nozzle heads, so as to save the cost.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A printing head assembly, adapted to drive at least two filaments to form on a base layer-by-layer to construct a three-dimensional object, the printing head assembly comprising:
   a fixing member, having an inlet side and an outlet side opposite to each other;
   at least two nozzle heads, respectively disposed at the outlet side of the fixing member, and each of the nozzle heads having a filament connection tube and a material extrusion port respectively penetrating through the fixing member, wherein the filament connection tube has a position-limiting portion;
   at least two driving units, respectively disposed at the inlet side of the fixing member, and respectively driving the corresponding filament to feed into the material extrusion port of the corresponding nozzle head from the corresponding filament connection tube through the fixing member;
   at least two position-limiting members, respectively disposed between the corresponding driving unit and the fixing member, and connected to the corresponding filament connection tubes; and
   at least two position-restoring members, respectively disposed between the corresponding position-limiting member and the fixing member, and located on the corresponding filament connection tube, wherein each of the filament connection tubes respectively leans against the fixing member through the corresponding position-limiting portion or the corresponding position-limiting member, so as to limit the material extrusion port of each of the nozzle heads to move between a first height level and a second height level through the corresponding driving unit and the corresponding position-restoring member, each of the position-restoring members comprises a spring or an element which releases a position-restoring force to drive the corresponding nozzle head to move.

2. The printing head assembly as claimed in claim 1, wherein when the corresponding filament is driven by the corresponding driving unit to move into the corresponding nozzle head, the filament pushes the nozzle head to move until the corresponding filament connection tube leans against the fixing member through the corresponding position-limiting member, so as to limit the material extrusion port of the nozzle head to correspond to the second height level.

3. The printing head assembly as claimed in claim 1, wherein when the corresponding filament stops moving into the corresponding nozzle head, the corresponding driving unit drives the filament to move oppositely, so as to drive the nozzle head to move oppositely relative to the fixing member until the corresponding filament connection tube leans against the fixing member through the corresponding position-limiting portion, such that the material extrusion port corresponds to the first height level.

4. The printing head assembly as claimed in claim 1, wherein when the corresponding filament stops moving into the corresponding nozzle head, the corresponding position-restoring member releases the position-restoring force to drive the nozzle head to move oppositely relative to the fixing member until the corresponding filament connection tube leans against the fixing member through the corresponding position-limiting portion, such that the material extrusion port corresponds to the first height level.

5. The printing head assembly as claimed in claim 1, wherein each of the driving units comprises:
   a motor;
   a driving wheel, connected to the motor; and
   a passive wheel, disposed at a side of the driving wheel, and the corresponding filament is clamped between the driving wheel and the passive wheel, when the motor drives the driving wheel to rotate along a clock direction, the driving wheel drives the passive wheel to rotate opposite to the clock direction, such that the driving wheel and the passive wheel drive the filament to move into the corresponding nozzle head.

6. The printing head assembly as claimed in claim 1, wherein each of the nozzle heads comprises a heating portion, the heating portion and the filament connection tube are connected to each other, and are respectively located at two opposite sides of the fixing member, the corresponding filament moves into the nozzle head from the filament connection tube, and is squeezed out from the material extrusion port after being heated into a molten state at the heating portion.

7. The printing head assembly as claimed in claim 6, wherein the fixing member comprises a cooling assembly, so as to avoid heat generated by the heating portion from transmitting to the filament connection tube.

8. The printing head assembly as claimed in claim 1, wherein the position-limiting portion of each of the filament connection tubes and the corresponding position-limiting member are respectively located at two opposite sides of the fixing member, after the corresponding filament is moved into the nozzle head, the nozzle head is moved relative to the fixing member until the corresponding filament connection tube leans against the fixing member through the position-limiting member, such that the material extrusion port corresponds to the second height level, and the at least two nozzle heads have a height difference therebetween, and when the corresponding filament stops moving into the corresponding nozzle head, the nozzle head is moved oppositely relative to the fixing member until the corresponding filament connection tube leans against the fixing member through the position-limiting portion, such that the material extrusion port corresponds to the first height level.

9. The printing head assembly as claimed in claim 1, wherein the second height level is lower than the first height level, and the printing head assembly conducts printing by using the corresponding filament and the nozzle head with the material extrusion port corresponding to the second height level.

10. The printing head assembly as claimed in claim 1, wherein each of the position-limiting members has a containing space, the position-limiting member is fixed to the corresponding filament connection tube in a manner that the containing space faces the fixing member, and the corresponding position-restoring member is disposed in the corresponding containing space and is located on the corresponding filament connection tube.

11. The printing head assembly as claimed in claim 1, wherein the nozzle heads are arranged in parallel to each other along a horizontal direction, and the driving units, the position-limiting members and the position-restoring members are respectively disposed corresponding to the nozzle heads.

12. The printing head assembly as claimed in claim 1, wherein the nozzle heads are configured surrounding a vertical direction serving as an axis, and the driving units, the position-limiting members and the position-restoring members are respectively configured corresponding to the nozzle heads.

13. The printing head assembly as claimed in claim 1, wherein the fixing member comprises at least two fixing portions separated from each other, wherein the fixing portions are located on a same horizontal reference plane, and respectively correspond to the nozzle heads.

* * * * *